United States Patent
Schreter

(10) Patent No.: US 12,346,224 B2
(45) Date of Patent: Jul. 1, 2025

(54) TIME TRAVEL USING INCREMENTAL DATABASE RECOVERY

(71) Applicant: SAP SE, Walldorf (DE)

(72) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 143 days.

(21) Appl. No.: 18/352,512

(22) Filed: Jul. 14, 2023

(65) Prior Publication Data

US 2025/0021448 A1    Jan. 16, 2025

(51) Int. Cl.
*G06F 11/00* (2006.01)
*G06F 11/14* (2006.01)

(52) U.S. Cl.
CPC ...... *G06F 11/1469* (2013.01); *G06F 11/1435* (2013.01); *G06F 11/1464* (2013.01); *G06F 2201/80* (2013.01)

(58) Field of Classification Search
CPC ............ G06F 11/1435; G06F 11/1464; G06F 11/1469; G06F 2201/80
See application file for complete search history.

(56) References Cited

U.S. PATENT DOCUMENTS

| | | | |
|---|---|---|---|
| 11,947,555 B1* | 4/2024 | Mohideen | G06F 16/2471 |
| 12,105,692 B1* | 10/2024 | Kumar | G06F 16/278 |
| 12,147,317 B1* | 11/2024 | Mohideen | G06F 11/1471 |
| 2012/0136835 A1* | 5/2012 | Kosuru | G06F 11/2094 |
| | | | 707/654 |
| 2019/0004906 A1* | 1/2019 | Shoolman | G06F 16/1805 |
| 2019/0179710 A1* | 6/2019 | Derryberry | G06F 11/1451 |
| 2020/0285542 A1* | 9/2020 | Deshpande | G06F 11/1451 |
| 2020/0301787 A1* | 9/2020 | Cabral | G06F 11/1469 |
| 2021/0157684 A1* | 5/2021 | Marathe | G06F 1/12 |
| 2024/0232022 A1* | 7/2024 | Kochar | G06F 11/1464 |

* cited by examiner

*Primary Examiner* — Joshua P Lottich
(74) *Attorney, Agent, or Firm* — Buckley, Maschoff & Talwalkar LLC

(57) ABSTRACT

Systems and methods include reception of a request to recover data of a first tenant to a point in time, determination of backups of first and second database table shards corresponding to the point in time, and generation of metadata associating a second tenant with the first and second shards and the backups. In response to a request to access the first second shards, it is determined based on the metadata that the first and second shards are not stored in a storage layer and, in response, the first shard is recovered to a first storage node from the backup of the first shard, the second shard is recovered to a second storage node from the backup of the second shard, and identifiers of the first storage node and the second storage node are returned.

18 Claims, 18 Drawing Sheets

TIME TRAVEL USING INCREMENTAL DATABASE RECOVERY

BACKGROUND

Modern organizations often utilize a system landscape consisting of distributed computing systems providing various computing services. For example, an organization may deploy services within computing systems located in on-premise data centers (which themselves may be located in disparate geographic locations) and within data centers provided by one or more Platform-as-a-Service (PaaS) providers. The computing systems may comprise cloud-based computing systems (e.g., providing services using scalable-on-demand virtual machines).

In a Software-as-a-Service (SaaS) model, a service provider deploys a service (e.g., a database) onto cloud-based computing systems (which may in some instances be provided by a separate PaaS provider). The service may be used by a customer in exchange for payment of a fee to the service provider. The customer is not involved with the operation, management or scaling of the service, all of which are performed by the service provider.

In the case of a database provided "as a service", a service provider would like to ensure scalability on both the storage and the compute layers of the database. Some deployments disaggregate the storage and the compute layers by utilizing a separate cluster of nodes for each layer. This disaggregation (theoretically) allows independent scaling of each of the layers.

The storage layer of such a database service may consist of many storage nodes, each of which contains local disk space and computing resources (e.g., RAM and CPU) to execute a storage node process. The database service may be a single-tenant system in which all of the storage nodes of the storage layer in combination store a single database. Since a tenant requires a separate tenant-specific storage layer in such implementations, these systems are cost-prohibitive for a small tenant. For larger tenants, the elasticity of such systems is unsuitable since the addition or deletion of individual storage nodes does not provide suitably-fine scaling increments.

It may become necessary to access a past version of the database to, for example, recover lost data or for auditing purposes. In order to gain access to such data without overwriting the current version of the database, a traditional database system requires an administrator to configure and instantiate a new equally-sized database system, identify a database backup corresponding to the point in time of the desired data, and restore the database backup to the new database system. This process is slow and requires a disproportionate amount of effort and resources.

Other database systems provide access to historical database data by simply storing the historical data along with current data in database tables of the database. The historical data may therefore be efficiently accessed from the corresponding database tables during database operation. However, the database tables including the historical data require additional storage and grow in size over time.

What is needed are systems to facilitate access to historical database data and which do not consume significant additional resources.

DETAILED DESCRIPTION

Figure 1:
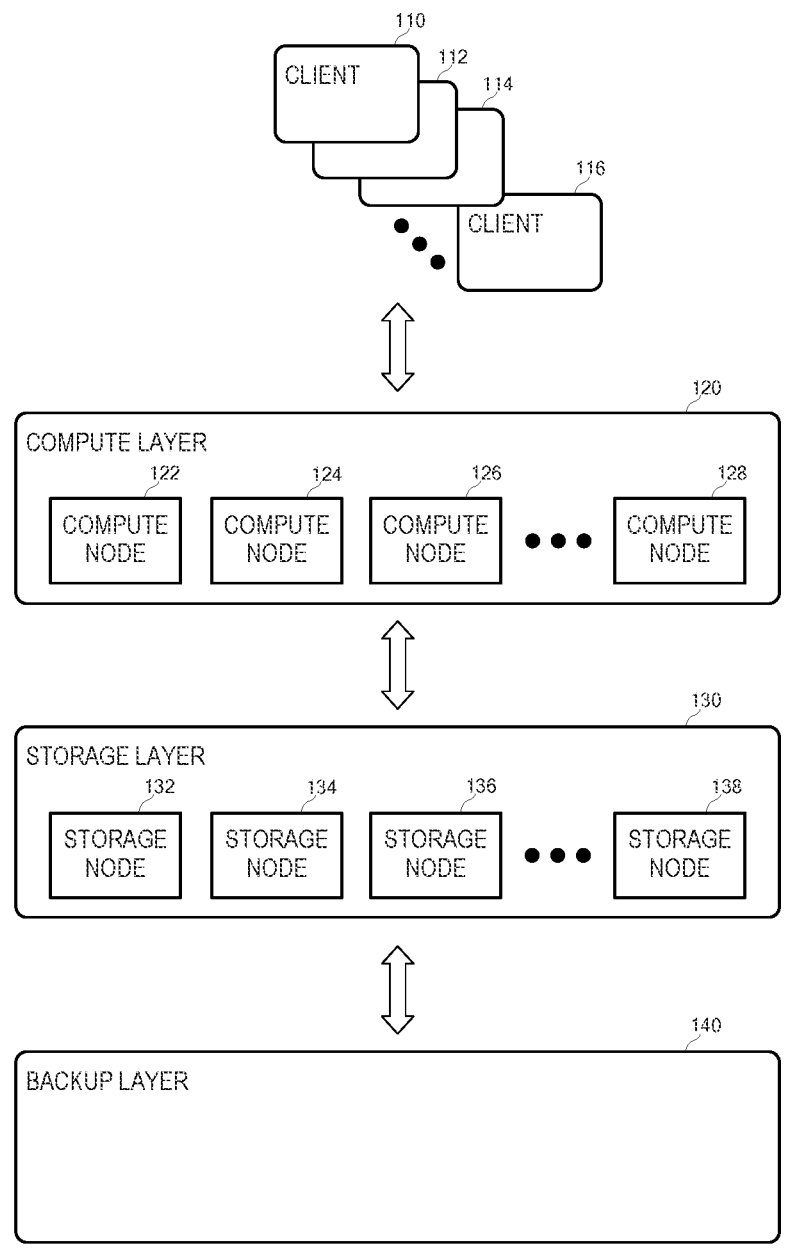
FIG. 1 illustrates a distributed database system according to some embodiments.

The following description is provided to enable any person in the art to make and use the described embodiments. Various modifications, however, will remain readily-apparent to those in the art.

According to some embodiments, the data of each tenant of a database system is logically split into shards and the shards of a given tenant are distributed across a plurality of storage nodes. The shards are large enough to amortize costs of operations on individual data items by allowing batch request processing, and small enough to allow suitably fast operations on entire shards (e.g., for backup/recovery, shard relocation). The shards may be substantially equally-sized and in the range of 1 GB-10 GB per shard in some embodiments.

Each shard stored on a storage node may be backed up to a backup layer implemented by an object storage service. The backup layer node may store backup data of one or more shards of each of one or more tenants. In one particular example, a system according to some embodiments may include a plurality of storage nodes which each store one or more shards of a given tenant, and a backup layer which stores the backup data of each of the shards of the given tenant in a separately-identifiable location.

Database data as it existed at a prior point in time will be referred to herein as "historical data". Historical data does not necessarily differ from current database data, rather, some historical data may be identical to corresponding current database data. Some embodiments may operate to efficiently provide access to historical data, without requiring significant additional resources.

For example, if an operator of a first database tenant deletes a table by mistake, the operator initiates the creation of metadata defining shards of database tables of a new database tenant based on existing metadata defining the shards of the database tables of the first database tenant. For each shard of the first database tenant, the new metadata copies the database table and key range specified in the existing metadata associated with the shard but replaces an identifier of the first tenant with an identifier of the new tenant and includes an identifier of a backup of the shard which corresponds to a particular point in time prior to the deletion. Creation of the new metadata may require less than one second.

As will be described in detail below, a frontend of the new tenant then simply reads the deleted table, which causes the shards of that table to be recovered from the stored backup data corresponding to a particular point in time to the database of the new tenant. The recovered data may then be copied to the database of the first tenant. If desired, the new tenant may be dropped thereafter, and all of its allocated resources released for other uses.

Similarly, if it is desired to view historical data of a database, the frontend of the new tenant reads the desired tables, in response to which the shards of the tables are recovered from the stored backup data to the new tenant database. The new tenant may be dropped once the desired data has been viewed, and all of its allocated resources released for other uses.

Since recovery of the shards into the new tenant database and reading the recovered shards therefrom is not resource-intensive, embodiments may utilize spare resources of a cloud environment (e.g., of a storage layer of storage nodes) to perform the recovery. In comparison to restoring an entire database in a secondary system to a specified point in time, embodiments significantly accelerate the recovery of desired data while conserving resources. Embodiments also provide reduced resource consumption with respect to systems which maintain historical data within database tables of a database. Some embodiments may maintain historical data within database tables and also provide the functionality described herein.

FIG. 1 illustrates a system according to some embodiments. The illustrated components of FIG. 1 may be implemented using any suitable combinations of computing hardware and/or software that are or become known. Such combinations may include cloud-based implementations in which computing resources are virtualized and allocated elastically. In some embodiments, two or more components are implemented by a single computing device.

Clients 110-116 may comprise computing systems executing applications or services which issue database queries. Clients 110-116 may issue the database queries in response to requests input thereto by users (not shown). Compute layer 120 receives the queries (e.g., via APIs provided by compute layer 120) and operates in conjunction with database data stored within storage layer 130 to provide corresponding query results to clients 110-116.

Compute layer 120 includes a plurality of compute nodes 122-128. Similarly, storage layer 130 includes a plurality of storage nodes 132-138. Each of nodes 122-128 and 132-138 includes at least one processing unit (e.g., a CPU), random access memory, and at least one data storage device (e.g., an NVMe SSD), and may comprise a single computer server, a group of computer servers, a virtual machine and any other combination that is or becomes known. In some embodiments, compute layer 120 is fully stateless and booted over the network, therefore compute nodes 122-128 are not required to include a data storage device. Storage nodes 132-138 and compute nodes 122-128 may include spare processing and/or storage resources to support incremental recovery of historical data as described herein.

In some embodiments, compute layer 120 and storage layer 130 are implemented by a Kubernetes cluster. Kubernetes is an open-source system for automating deployment, scaling and management of containerized applications. A Kubernetes cluster consists of many nodes, which in turn may comprise physical servers and/or virtual machines. A node executes an application within a software container. One or more containers may be grouped into a pod, where each container of a given pod shares the same computing resources and local network.

Backup layer 140 provides object storage to storage layer 130. Each storage node 132-138 of storage layer may store its block-based data as objects within backup layer 140. Backup layer 140 may provide object storage through a web service interface in some embodiments. Backup layer 140 may comprise an object store service provided by a hyperscaler (e.g., AWS S3). Storage layer 130 identifies backup data for a particular shard stored in layer 140 via an abstract backup location identifier. In some embodiments, the backup location identifier may comprise a composition of a corresponding tenant ID, shard ID and version counter.

Storage nodes 132-138 may store data associated with multiple tenants. The data is stored in shards which are distributed across storage nodes 132-138. Each of compute nodes 122-128 may execute a tenant-specific single-tenant database instance. Accordingly, in a case that client 110 is being accessed by a user of a first tenant, queries issued by client 110 are directed to the one of compute nodes 122-128 which is associated with the first tenant. In yet another example, storage nodes 132-138 store data associated with multiple tenants, and each of compute nodes 122-128 executes a multi-tenant database instance. Accordingly, any of compute nodes 122-128 are capable of handling queries received from clients 110-116 regardless of the tenant whose data is being queried.

Backup layer 140 may store backup data of one or more shards of one or more tenant databases. As described herein, the data of one of the tenants may be incrementally recovered on-demand to storage nodes 132-138 from backup data of another tenant. The stored backup data may include, for each shard, backup data associated with different respective prior points in time. For each shard, one or more of backup locations 142-148 may store backup data associated with different savepoints. Additionally, shard backup data associated with a savepoint may include logs which are usable as is known in the art to replay the data of a shard to a particular point in time which is subsequent to the time of the savepoint and prior to the time of a next savepoint.

Figure 2:
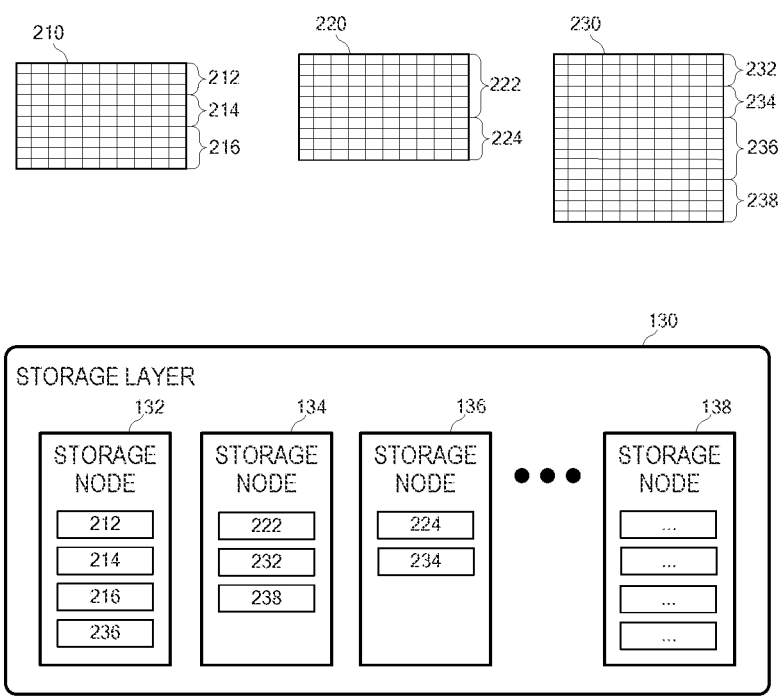
FIG. 2 illustrates storage of database table shards on a plurality of storage nodes according to some embodiments.

FIG. 2 illustrates storage of database table shards of a single tenant on a plurality of storage nodes according to some embodiments. Database tables 210, 220 and 230 are logical representations of data associated with a given database tenant. Database tables 210, 220 and 230 may conform to a particular schema as is known in the art. According to some embodiments, each row of each of database tables 210, 220 and 230 includes values describing an instance of an object. Embodiments are not limited to any types of objects.

Each of database tables 210, 220 and 230 is split into multiple shards. Specifically, database table 210 is split into shards 212, 214 and 216, database table 220 is split into shards 222 and 224, and database table 230 is split into shards 232, 234, 236 and 238. Each shard is associated with a key range. The shards may be substantially equally-sized and the size of each shard may be between 1 GB and 10 GB in some embodiments. Embodiments include any algorithm for splitting a table into shards and for defining the key ranges of the shards. In one implementation, storage layer 130 is a key/value store and the key range of a shard is the key range of stored keys in that shard. According to some embodiments, a shard may include data of more than one database tables.

According to the present example, the shards are stored across storage nodes 132, 134 and 136 of storage layer 130. Storage node 132 stores shards 212, 214, 216 and 236, storage node 134 stores shards 222, 232 and 238, and storage node 136 stores shards 224 and 234. It is assumed that storage node 138 and any other storage nodes of storage layer 130 store shards of other unshown database tables of the tenant.

The distribution of the shards across the storage nodes of storage layer 130 may be based on any suitable algorithm. Since storage node 132 stores all shards 212, 214, 216 of table 210, failure of node 132 results in inaccessibility of all of the data of table 210. In some embodiments, each shard of a table is preferably stored on a different node (e.g., shards 222 and 224 of table 220), such that failure of a node results in inaccessibility of at most one shard of the table. Some embodiments may store at most one shard of a given tenant per storage node.

Figure 3:
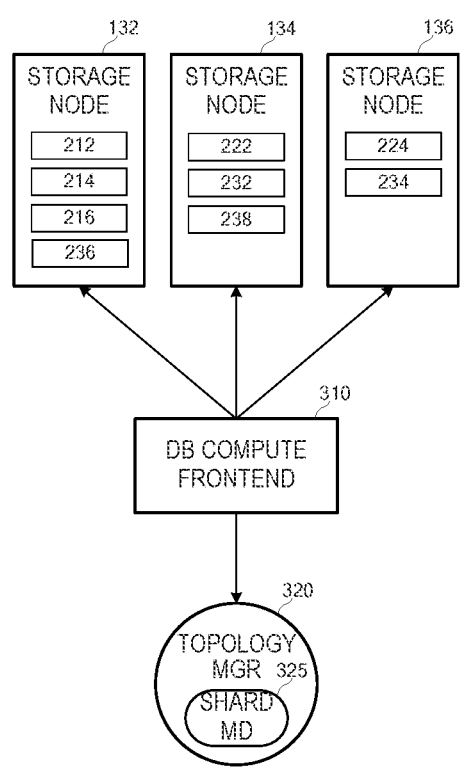
FIG. 3 illustrates access to database table shards according to some embodiments.

FIG. 3 illustrates access to database table shards according to some embodiments. Database compute frontend 310 may comprise a database instance executing on a compute node as described above. Database compute frontend 310 may need to access database table data in response to a query received from a client. However, due to the shard storage described above, database compute frontend 310 must initially identify the storage node(s) which store the shards containing the desired data in order to direct its requests to the appropriate storage node(s).

Topology manager 320 consists of one or more storage nodes which store shard metadata 325. Shard metadata 325 may be associated with a well-known ID in the system and may be stored in one or more storage nodes of a storage layer in the same manner as the other shards described herein. According to some embodiments, shard metadata 325 specifies the storage locations of the database shards. For example, shard metadata 325 may identify each shard by a table ID and a key range. Moreover, shard metadata 325 also associates each shard with an identifier of a storage node on which it is stored. Accordingly, database compute frontend 310 queries topology manager 320 for the location of the shards associated with a query (e.g., all shards of a given table) and receives in return an indication of the storage node(s) in which the desired shard(s) are stored. Database compute frontend 310 then issues database operations to the node(s) on which the shard(s) are stored. As described above, the operations may advantageously be performed in parallel if the shards are located on more than one storage node.

In some embodiments, creation of new tenant metadata within shard metadata 325 causes creation of a tenant root shard on a given storage node. This tenant root shard includes the above-described shard metadata 325 associated with the tenant. Therefore, in response to a received query, database compute frontend 310 queries topology manager 320 for the location of the root shard of the tenant associated with a query, retrieves the shard metadata from the root shard, and determines the storage node(s) in which the desired shard(s) are stored based on the retrieved shard metadata.

Figure 4:
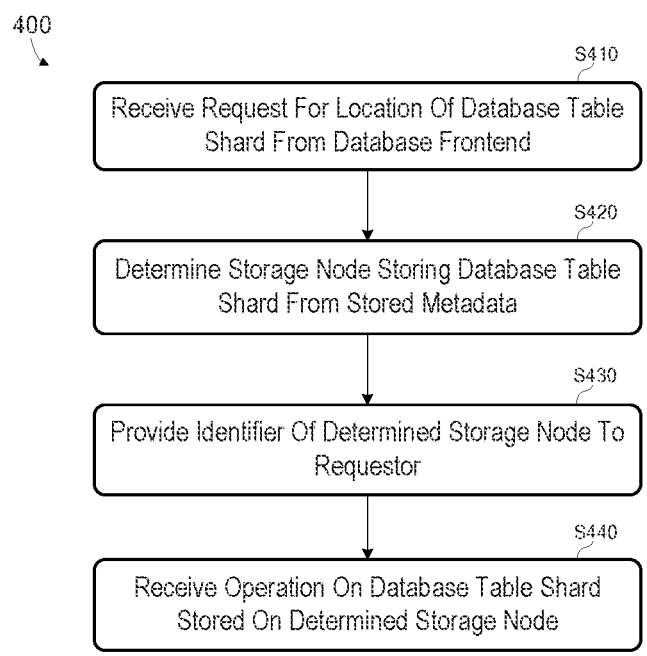
FIG. 4 is a flow diagram of a process to access database table shards on storage nodes according to some embodiments.

FIG. 4 is a flow diagram of process 400 to access database table shards on storage nodes according to some embodiments. Process 400 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Process 400 assumes the prior storage of database table shards on multiple storage nodes as described above. At S410, a request is received for the location of a database table shard. The request may identify the shard using a database table identifier and one or more primary keys (or a primary key range) of the identified table. The request is received from a database frontend, which may be executing on a compute node of a compute layer as described above. The shard may include data required to serve a query received from a client application by the database frontend.

In response to the request, a storage node storing the shard is determined based on stored metadata. According to some embodiments, the stored metadata is shard metadata stored by a topology manager as described above. Such a topology manager may therefore receive the request at S410 and determine the storage node based on the request and the shard metadata at S420. In one example, the request includes a database table identifier and a primary key range. The topology manager may determine a shard which includes the primary key range of the identified table based on the shard metadata at S420, and further determine a storage node storing the shard based on the shard metadata. In some embodiments, S420 includes determination of a root shard of a tenant associated with the query and determination of the storage node(s) in which the desired shard(s) are stored based on metadata stored in the root shard. An identifier of the determined storage node(s) is provided to the requestor at S430.

It may be determined at S420 that the primary key range spans two or more shards, in which case the storage nodes storing the two or more shards are determined at S420. In another example, the request includes only a table identifier and no primary keys or key range. Accordingly, S420 includes determination of all shards of the identified table and their corresponding storage nodes. The received request may include any number of table identifiers and associated key ranges.

A database operation on the shard is received at the database node on which the shard is stored at S440. The database operation may be issued by the database frontend from which the request was received at S410, and may utilize the identifier provided at S430. If more than one storage node has been identified, a database operation may be issued to and received at each other node at S440, thereby enabling parallel execution of the operations by the more than one storage nodes.

Figure 5A:
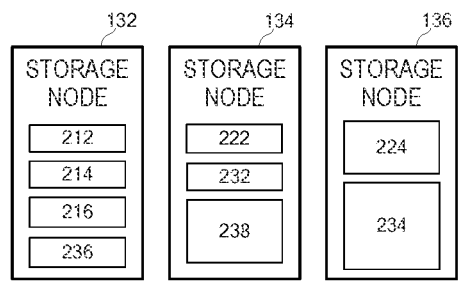
FIGS. 5*a* through 5*c* illustrate a scale-out process according to some embodiments.
Figure 5B:
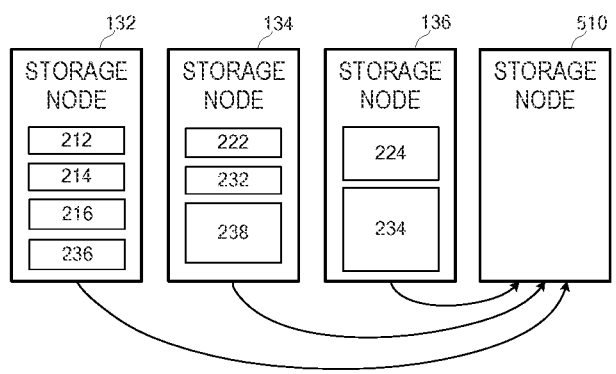
Figure 5C:
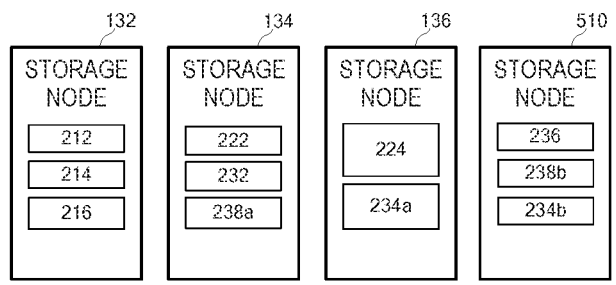

FIGS. 5a through 5c illustrate a scale-out process according to some embodiments. Storage nodes 132, 134 and 136 of FIG. 5a store respective shards, some of which have grown in size with respect to FIG. 3. It may therefore be manually or automatically (based on resource consumption parameters) determined to reduce the amount of storage consumed by one of the storage nodes by adding another storage node to the corresponding storage layer. Such a determination may be performed by a topology manager according to some embodiments. It may also or alternatively be determined to divide shards 234 and 238 because their size exceeds a specified maximum shard size.

FIG. 5b illustrates the addition of storage node 510 to the storage layer. FIG. 5b also illustrates the movement of shards from each of storage nodes 132, 134 and 136 to storage node 510. The movement may be intended to achieve load balancing which reducing the memory consumption per node.

FIG. 5c illustrates the resulting storage layer. As shown, shard 236 has moved from storage node 132 to storage node 510. Shard 238 has been divided into shards 238a and 238b and shard 238b has moved from storage node 134 to storage node 510. Similarly, shard 234 has been divided into shards 234a and 234b and shard 234b has moved from storage node 136 to storage node 510. Embodiments are not limited to division of a shard into equally-sized shards.

Advantageously, the shards moved to node 510 are each moved over different (and substantially independent) node-to-node network connections. Movement of the shards therefore may occur substantially faster than in a case where all three shards travel from a single node to node 510. Moreover, this movement only requires the nodes from which the shards are moved to use 1/n of their respective bandwidth. Consequently, impact on node performance and system response time is minimal.

Division of a shard and movement of the resulting shards may occur with or without the addition of a storage node. Addition of a storage node and movement of shards thereto may also occur with or without dividing any shards.

Figure 6A:
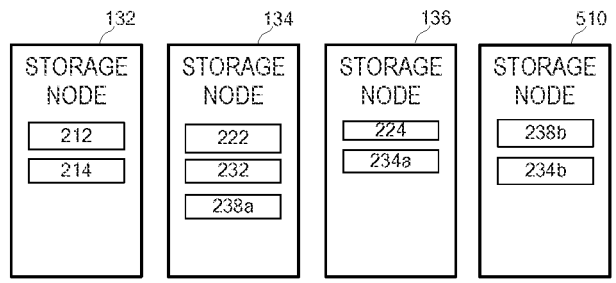
FIGS. 6*a* through 6*c* illustrate a scale-in process according to some embodiments.
Figure 6B:
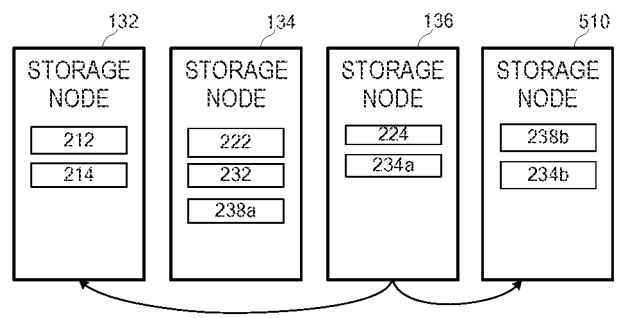
Figure 6C:
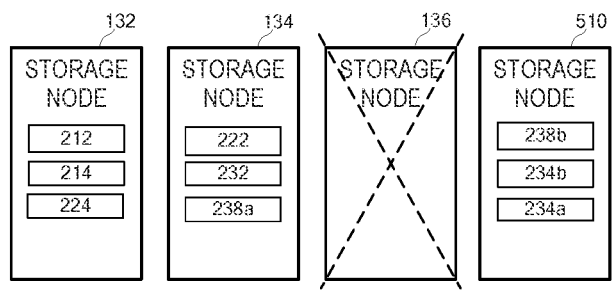

FIGS. 6a through 6c illustrate a scale-in process according to some embodiments. FIG. 6a illustrates storage nodes 132, 134, 136 and 138 in which some shards are smaller than shown in FIG. 5c. It may therefore be manually or automatically (again, based on resource consumption parameters) determined to reduce the number of storage nodes of the corresponding storage layer. This determination may be performed by a topology manager according to some embodiments.

In the present example, it is determined to decommission storage node 136. Accordingly, FIG. 6b illustrates the movement of the shards of storage node 136 to storage nodes 132 and 510. The storage nodes to which the shards are moved are determined so as to achieve load balancing in some embodiments.

FIG. 6c illustrates the resulting storage layer, in which shard 224 has moved from storage node 136 to storage node 132 and shard 234a has moved from storage node 136 to storage node 510. Storage node 136 no longer stores any shards and may therefore be decommissioned. According to some embodiments, scaling-in may also or alternatively include merging two or more small shards into one shard, and placing the one shard on a storage node based on load balancing and resource consumption considerations. Due to the key range associated with each shard, shards should only be merged with shards that are associated with an adjacent key range according to some embodiments.

Figure 7:
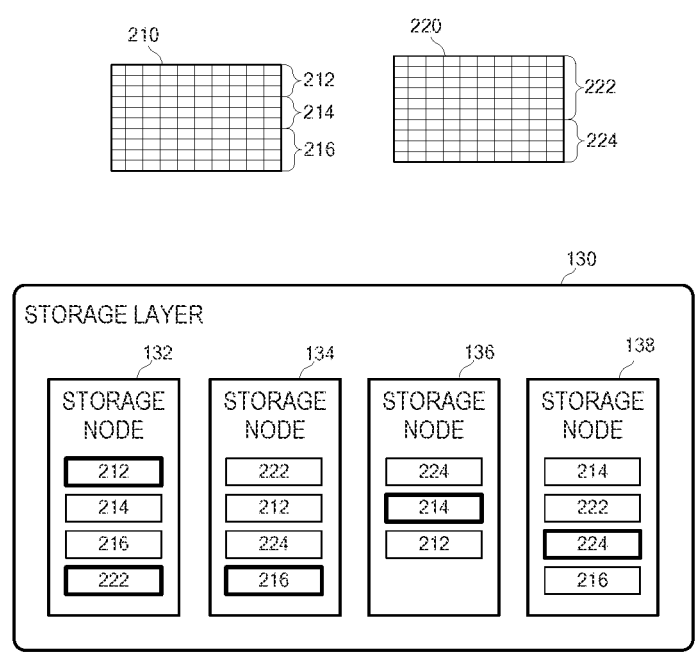
FIG. 7 illustrates storage of database table shard replicas on a plurality of storage nodes according to some embodiments.

FIG. 7 illustrates storage of database table shard replicas of a single tenant on a plurality of storage nodes according to some embodiments. As described with respect to FIG. 2, database tables 210 and 220 and 230 are logical representations of data associated with a given database tenant and are split into multiple shards associated with different key ranges.

As shown in FIG. 7, storage layer 130 store multiple replicas of each of shards 212, 214, 216, 222 and 224. Replication may be performed in any suitable manner such as by using a consensus protocol, employing erasure codings across replicas, etc., each of which may exhibit different advantages and disadvantages based on the use case. The distribution of the replicas across the storage nodes of storage layer 130 may be based on any suitable-algorithm which may provide load-balancing and high availability.

Although three replicas per shard are illustrated in FIG. 7, embodiments may utilize any number of replicas. In the case of a protocol which replicates each shard across three different storage nodes, the data of a particular shard remains fully accessible if one of the three storage nodes serving this shard fails or is decommissioned. If the replication factor is set greater than three, then the system continues normal operation even in the case of multiple node failures (e.g., two node failures using a replication factor of five, or in general k node failures with a replication factor of 2k+1).

FIG. 7 reflects a consensus protocol in which each shard is represented by a leader replica and two follower replicas. The leader replica is determined by a leader election algorithm and is denoted by a pronounced outline in FIG. 7. All operations on a given shard are directed to the storage node which stores the leader replica of the shard, and changes thereto are replicated to the follower replicas of the shard. If a node including a leader replica of a shard fails, one of the remaining follower replicas of the shard is designated the leader replica and the new leader replica begins to replicate its changes to the remaining follower replicas. Moreover, as will be described below, a new follower replica is quickly instantiated on another (or new) storage node to reestablish the desired consensus protocol.

Figure 8:
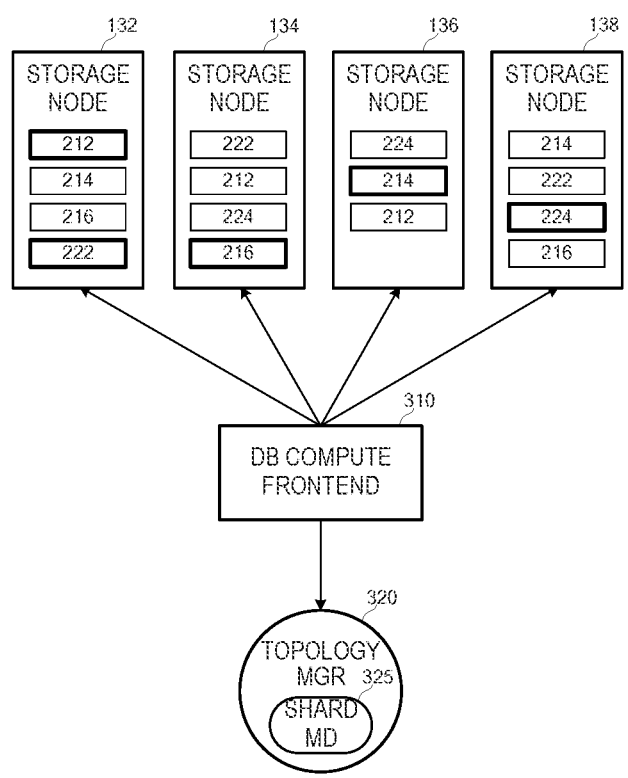
FIG. 8 illustrates access to database table shards according to some embodiments.

FIG. 8 illustrates access to leader replicas of shards according to some embodiments. Database compute frontend 310 determines the location of the leader replicas of shards containing the desired data in order to direct its requests to the appropriate storage node(s). Shard metadata 325 of topology manager 320 specifies the storage locations of all replicas of each shard and notes the current leader replica of each shard. If a storage node including a leader replica of a shard fails or is decommissioned, a new leader replica of the shard is elected and shard metadata 325 is updated accordingly. Any follower replicas stored on the failed/decommissioned storage node are removed from shard metadata 325. Shard metadata 325 also specifies a table ID and a key range of each shard.

Accordingly, database compute frontend 310 queries topology manager 320 for the location of the shards associated with a query (e.g., all shards of a given table) and receives therefrom an identifier of the storage node(s) in which the leader replicas of the desired shard(s) are stored. Database compute frontend 310 then issues database operations to the node(s) on which the leader replicas shard(s) are stored. Again, the operations may advantageously be performed in parallel if the shards are located on more than one storage node.

Database compute frontend 310 may also receive identifiers of the storage nodes in which the follower replicas of the desired shard(s) are stored. Accordingly, if an operation to an identified leader replica fails, database compute frontend 310 may seamlessly retry the operation on one of the corresponding follower replicas stored on a different storage node.

In some embodiments, a root shard stores shard metadata 325 instead of topology manager 320, and topology manager 320 merely stores the location of the root shard. The root shard may also be stored among storage nodes 132-138 in multiple replicas, in which case topology manager 320 stores the location of each replica.

Figure 9A:
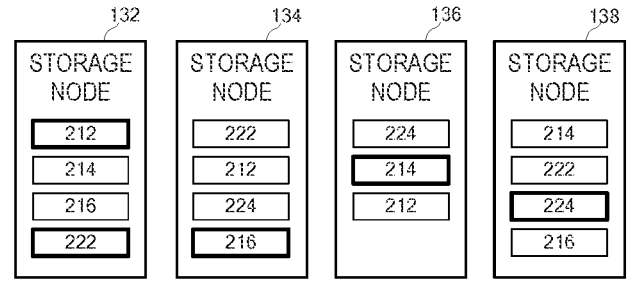
FIGS. 9*a* through 9*c* illustrate a scale-out process using database table shard replicas according to some embodiments.
Figure 9B:
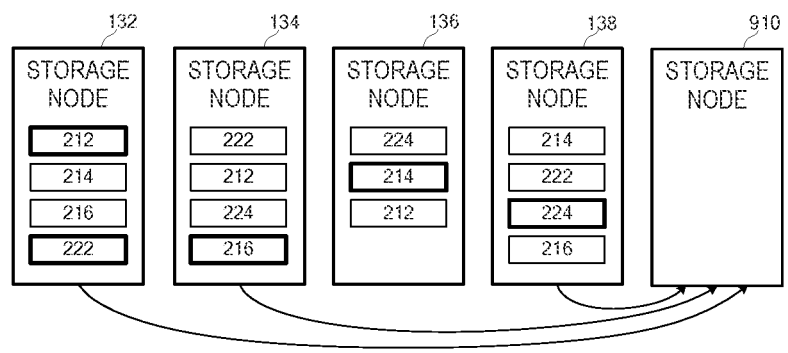
Figure 9C:
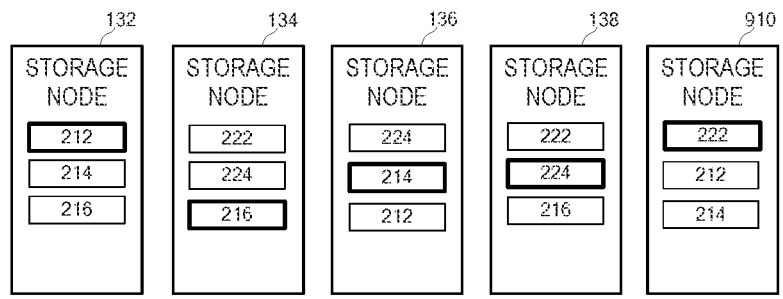

FIGS. 9a through 9c illustrate a scale-out process using database table shard replicas according to some embodiments. Storage nodes 132, 134, 136 and 138 of FIG. 9a store respective shards as shown in FIGS. 7 and 8. It will be assumed that it is manually or automatically determined to add another storage node to the corresponding storage layer to, for example, reduce the amount of storage consumed by one of the storage nodes or provide improved availability.

FIG. 9b illustrates the addition of storage node 910 to the storage layer. As also illustrated in FIG. 9b, shards are moved from each of storage nodes 132, 134 and 138 to storage node 910. FIG. 9c illustrates the resulting storage layer. Shard 222 has moved from storage node 132 to storage node 910, shard 212 has moved from storage node 134 to storage node 910, and shard 214 has moved from storage node 138 to storage node 910. In all examples described herein, shard metadata 325 is updated to reflect new replica storage locations due to movement of shards between storage nodes.

The shards are moved to node 910 over different (and substantially independent) node-to-node network connections (i.e., 132 to 910, 134 to 910 and 138 to 910). By copying one shard rather than three, nodes 132, 134 and 138 are respectively taxed much less than other implementations.

Figure 10A:
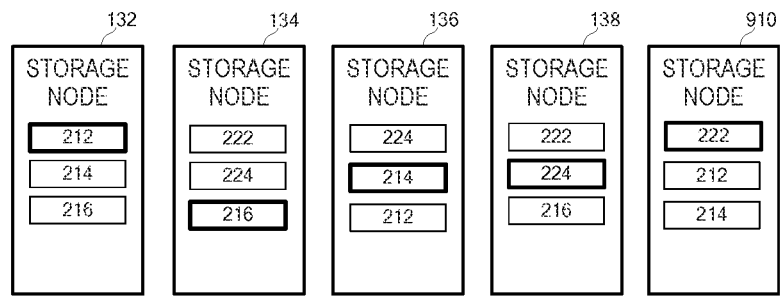
FIGS. 10*a* through 10*c* illustrate a scale-in process using database table shard replicas according to some embodiments.
Figure 10B:
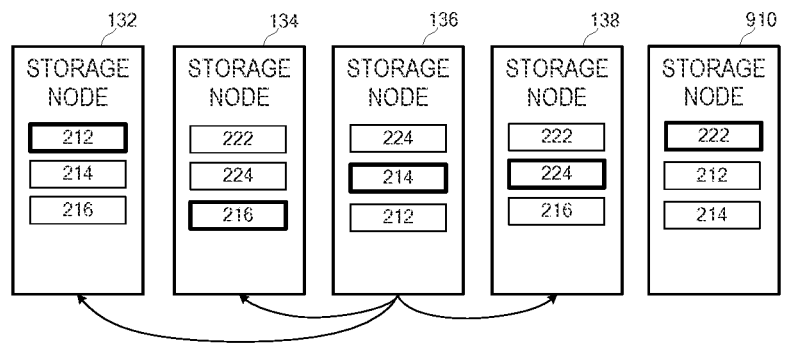
Figure 10C:
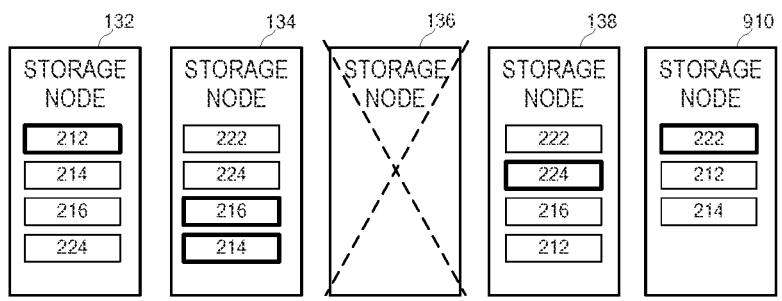

FIGS. 10a through 10c illustrate a scale-in process using database table shard replicas according to some embodiments. FIG. 10a reflects a storage layer as described with respect to FIG. 9c. It will be assumed that it is manually or automatically determined to decommission storage node 136, perhaps based on under-utilization of one or more storage nodes of the depicted storage layer.

FIG. 10b illustrates the movement of the shards of storage node 136 to storage nodes 132, 134 and 138. The shards to be moved and the storage nodes to which the shards are moved may be determined based on a load-balancing and/or resource consumption algorithm in some embodiments. FIG. 10c illustrates the resulting storage layer, in which shard 224 has moved from storage node 136 to storage node 132, shard 214 has moved from storage node 136 to storage node 134, and shard 212 has moved from storage node 136 to storage node 138. Since storage node 136 no longer stores any shards, it may be decommissioned. Shard metadata 325 is then updated to reflect new replica storage locations due to the above-described movement of shards between storage nodes.

Figure 11A:
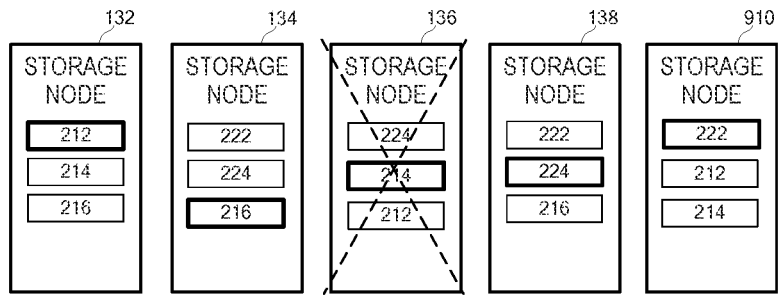
FIGS. 11*a* through 11*c* illustrate a recovery process using database table shard replicas according to some embodiments.
Figure 11B:
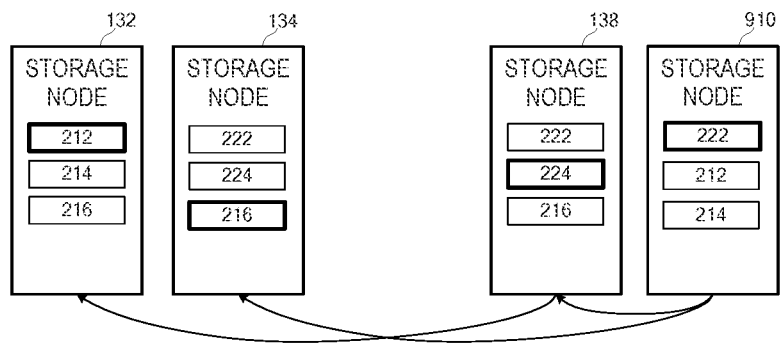
Figure 11C:
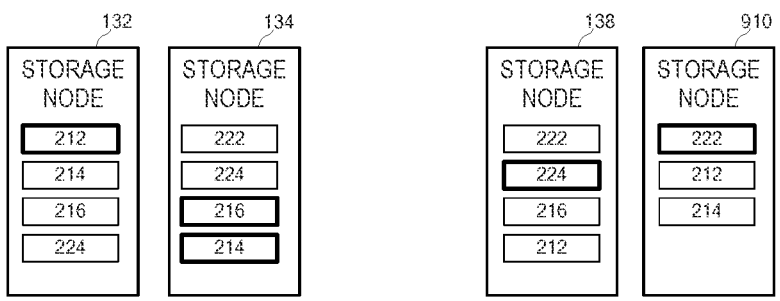

FIGS. 11a through 11c illustrate a recovery process using database table shard replicas according to some embodiments. FIG. 11a reflects a storage layer as described with respect to FIG. 10a, but in this case it is assumed that storage node 136 unexpectedly fails. In some implementations, decommissioning of node 136 may also proceed as described below with respect to FIGS. 11a-11c.

Upon detecting the failure, topology manager 320 accesses shard metadata 325 to determine the shards which were stored on storage node 136. Next, topology manager 320 identifies, based on shard metadata 325, which of the remaining storage nodes stores replicas of the shards which were stored on storage node 136. Topology manager 320 then instructs the storage layer to copy a replica of each of the shards which were stored on storage node 136 from a remaining storage node to a different remaining storage node.

FIG. 11b illustrates the copying of the replicas of each of the shards which were stored on failed storage node 136 to other storage nodes. For example, shard metadata 325 indicates that failed storage node 136 stored replicas of shards 224, 214 and 212, and that the replica of shard 214 was a leader replica. Shard metadata 325 also indicates that replicas of shard 224 are located on nodes 134 and 138, replicas of shard 214 are located on nodes 132 and 910, and replicas of shard 212 are located on nodes 132 and 910. Accordingly, FIG. 11b illustrates the copying of shard 224 from node 138 to node 132, of shard 214 from node 910 to node 134, and of shard 212 from node 910 to node 138. As noted above, copying between different sets of nodes allows each copy operation to proceed in parallel and to use the full available node-to-node bandwidth. FIG. 11c illustrates the resulting storage layer after completion of the copy operations.

The particular storage nodes from and to which the shards are copied may be determined based on a load-balancing and/or resource consumption algorithm according to some embodiments. Shard metadata 325 is updated to reflect the new replica storage locations. The update may also include election of the replica of shard 214 stored in node 134 as the leader replica, and indication of the election in shard metadata 325.

Figure 12:
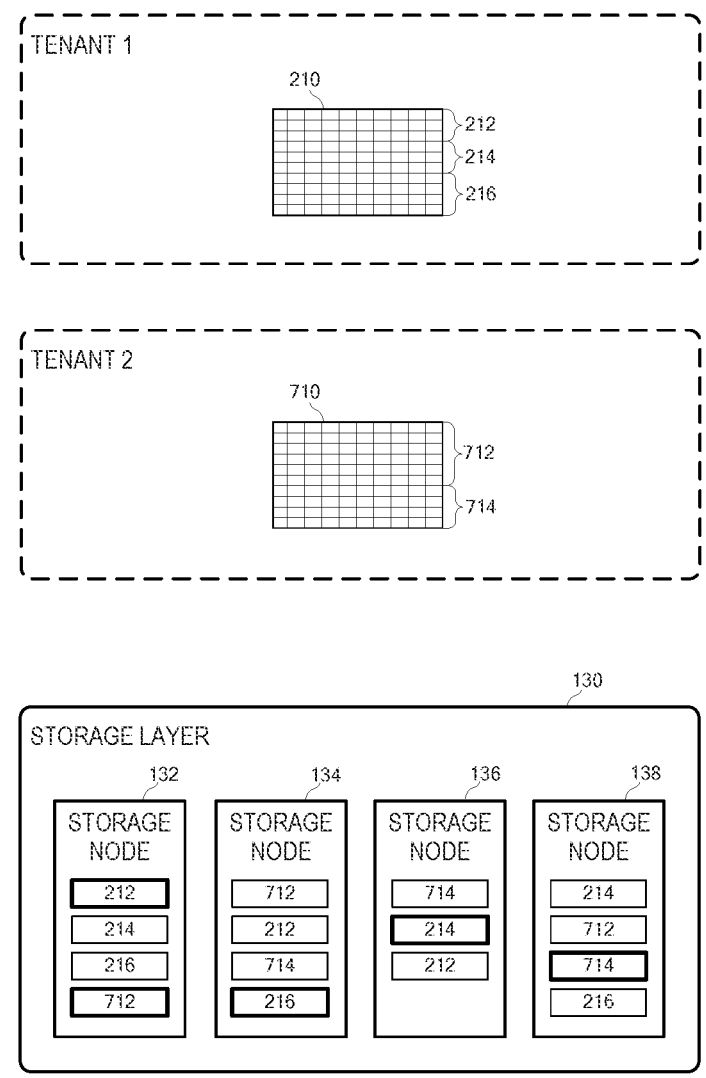
FIG. 12 illustrates storage of database table shard replicas of multiple tenants on a plurality of storage nodes according to some embodiments.

FIG. 12 illustrates storage of database table shard replicas of multiple tenants on a plurality of storage nodes according to some embodiments. Database table 210 includes data of Tenant 1 and database table 710 includes data of Tenant 2. Database table 210 conforms to a schema associated with Tenant 1 and database table 710 conforms to a schema associated with Tenant 2. Each tenant may be associated with many other database tables including their respective data. As is known in the art, the data of Tenant 1 is intended to be accessible only to users of Tenant 1 and the data of Tenant 2 is intended to be accessible only to users of Tenant 2.

In the illustrated example, table 210 is divided into shards 212, 214 and 216, and table 710 is divided into shards 712 and 714. Storage layer 130 stores multiple replicas of each of shards 212, 214, 216, 712 and 714 as described above with respect to FIG. 7. FIG. 12 represents a consensus protocol consisting of a leader replica (i.e., denoted by a pronounced outline) and two follower replicas for each shard. The replicas may be distributed across the storage nodes of storage layer 130 based on any suitable algorithm for providing load-balancing and high availability. Scale-out, scale-in, and failure recovery of the nodes shown in FIG. 12 may proceed in the manners described above with respect to FIGS. 9a-9c. 10a-10c and 11a-11c.

Figure 13:
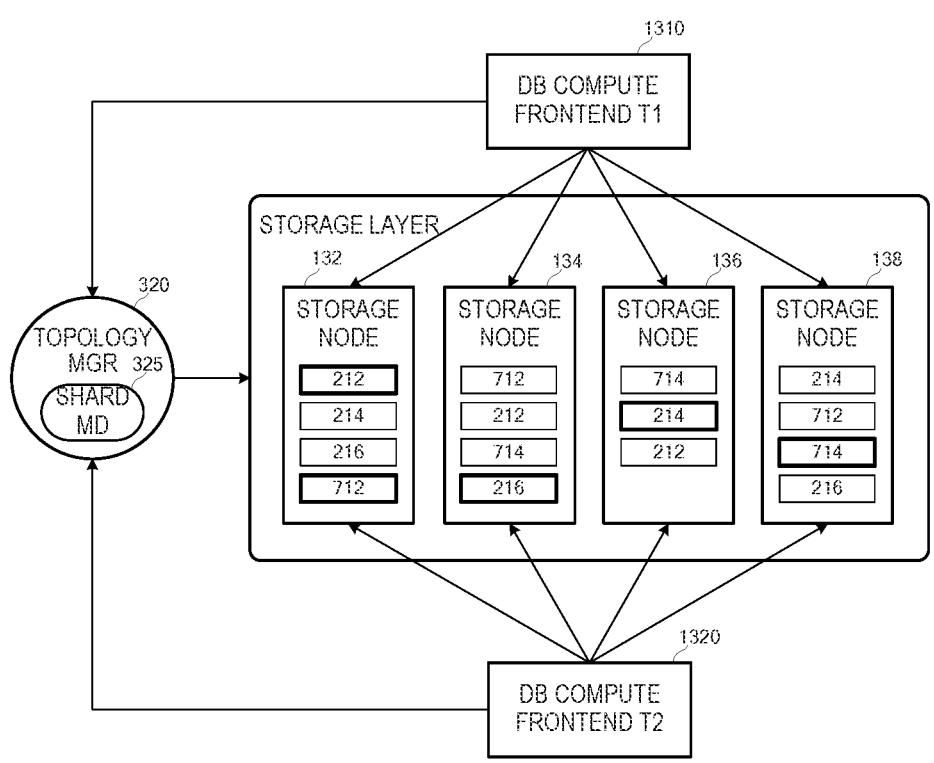
FIG. 13 illustrates access to database table shards of multiple tenants according to some embodiments.

FIG. 13 illustrates access to database table shards of multiple tenants according to some embodiments.

Database compute frontend 1310 serves users of Tenant 1 and database compute frontend 1320 serves users of Tenant 2. Database compute frontend 1310 may comprise a single-tenant database instance executing on a single compute node of a compute layer, and database compute frontend 1320 may comprise a single-tenant database instance executing on another single compute node of the compute layer. In some embodiments, database compute frontend 1310 and database compute frontend 1320 execute on a same compute node.

Topology manager 320 may operate as described above. As also described above, shard metadata 325 may associate each shard with a table identifier, a key range, locations of each replica, and an identifier of a leader replica. However, since table 210 and table 710 conform to different schemas, table identifiers and key ranges of the tables of Tenant 1 might overlap/conflict with table identifiers and key ranges of the tables of Tenant 2. Accordingly, shard metadata 325 also associates each shard with a tenant identifier. If database compute frontends 1310 and 1320 are single-tenant database frontends, the tenant identifier may be an identifier of the container in which the frontends are executing.

In response to a received query, database compute frontend 1310 (or frontend 1320) queries topology manager 320 for the location of the shard(s) associated with the query. The query of topology manager 320 includes a tenant identifier, a table identifier, and a key range (e.g., as a concatenated string). Topology manager 320 determines an identifier of the storage node(s) in which the leader replicas of the desired shard(s) are stored based on the query received from database compute frontend 1310 (or frontend 1320) and shard metadata 325. Database compute frontend 1310 (or frontend 1320) then issues database operations to the node(s) on which the leader replicas shard(s) are stored. The storage nodes may perform these operations in parallel if the shards are located on more than one storage node.

In some embodiments, each tenant is associated with a root shard which includes the shard metadata for the tenant, and topology manager 320 stores the location of the root shard for each tenant. Database compute frontend 1310 or 1320 may therefore query topology manager 320 for the storage node which stores the root shard of a given tenant, read the metadata of the root shard from the storage node, and determine locations of desired shards based on the metadata. Each root shard may also be stored among storage nodes 132-138 in multiple replicas, in which case topology manager 320 stores the location of each replica of each root shard.

Some embodiments include a multi-tenant database compute frontend which serves users of Tenant 1 and users of Tenant 2. The multi-tenant database compute frontend accesses shard replicas as described above with respect to both database compute frontend 1310 and database compute frontend 1320, using an appropriate tenant identifier to query topology manager 320.

Figure 14:
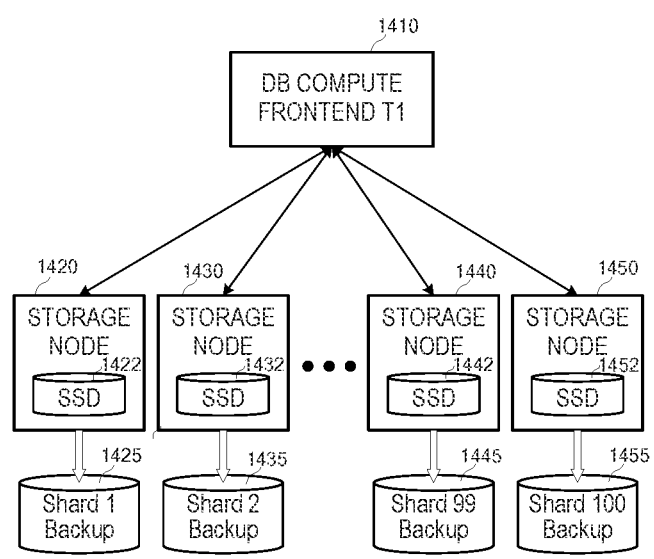
FIG. 14 illustrates storage of shard backups from a plurality of storage nodes to a plurality of backup locations according to some embodiments.

FIG. 14 illustrates storage of shard backups from a plurality of storage nodes to a plurality of backup locations according to some embodiments. Storage nodes 1420, 1430, 1440 store database table shards of a database associated with a first tenant T1 in their respective storage devices 1422, 1432, 1442 and 1452 as described above. Each of storage nodes 1420, 1430, 1440 and 1450 may store a respective single shard of the database, but embodiments are not limited thereto.

Database compute frontend 1410 may serve users of the first tenant T1. During operation, database compute frontend 1410 may request operations on stored database table shards of storage nodes 132-138 as described above. From time-to-time during operation, and as is known in the art, backup data of the respective shards of storage nodes 1420, 1430, 1440 and 1450 is stored into respective ones of backup locations 1425, 1435, 1445 and 1455. For each shard, the stored backup data may comprise a snapshot associated with a particular point in time and/or a snapshot associated with a particular point in time and corresponding logs as is known in the art. The backup data may comprise object data suitable for storage in backup locations 1425, 1435, 1445 and 1455, rather than block-based data. Embodiments are not limited to a one-to-one-to-one correspondence between storage nodes and shards.

Figure 15:
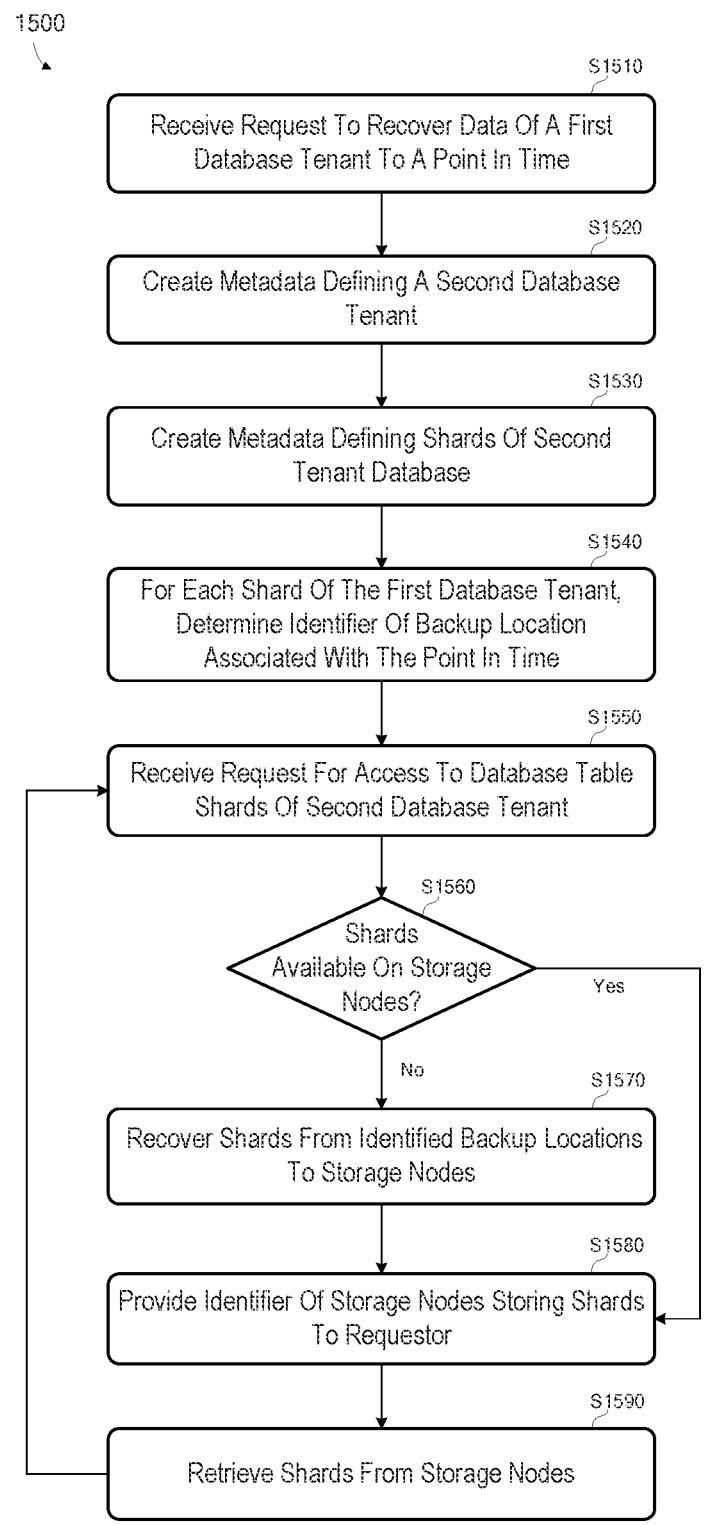
FIG. 15 is a flow diagram of a process to access historical database data of a first database tenant using a second database tenant according to some embodiments.

FIG. 15 is a flow diagram of process 1500 to access historical data of a first database tenant using a second database tenant according to some embodiments. At S1510, a request is received to recover database tables of a first database tenant to a point in time. The request may be issued by an administrator in order to retrieve previously-deleted or modified data, to view the database as it existed at the particular point in time, or for any other reason.

Metadata defining a second database tenant is created at S1520 in response to the received request. According to some embodiments, a record of the second tenant is created in a system control shard stored in the storage layer of the database system. Creation of the record causes creation of a new root shard associated with the second database tenant. The new root shard is stored in a storage node of the storage layer and the system control shard is updated to specify the storage node in which the root shard of the second tenant is stored. Replicas of both the system control shard and the new root shard may be stored in other storage nodes to provide redundancy as described above.

Metadata defining shards of the database of the second tenant is created at S1530. The metadata may be stored in the root shard of the second tenant and may be created based on the metadata stored in the root shard of the first database tenant. Accordingly, S1530 may comprise accessing the root shard of the first database tenant using the metadata of the system control shared. The created metadata may specify, for each shard of the first tenant database, a database table to which the shard belongs, and a key range of the shard.

At S1540, an identifier of shard backup data which is associated with the point in time is determined for each shard of the first tenant database. In this regard, each shard of the first tenant database is independently backed up to a backup location at times which may differ from times at which other shards are backed up. Accordingly, each shard of the first tenant may be backed up to many instances of backup data, where each instance is associated with a point in time (or range of times) and each instance is stored at a particular backup location (i.e., identified by an abstract backup location ID) of the backup layer. To determine the instance of backup data of each shard which is associated with the point in time, the point in time may be translated to, for example, a log sequence number, a transaction ID, a standardized time, etc. Then, for each shard, an identifier of specific backup data (e.g., an object ID or other abstract backup location ID) which encompasses the log sequence number, transaction ID, standardized time, etc. is determined. The backup data identifier for each shard is stored in the metadata of the second tenant root shard.

Figure 16:
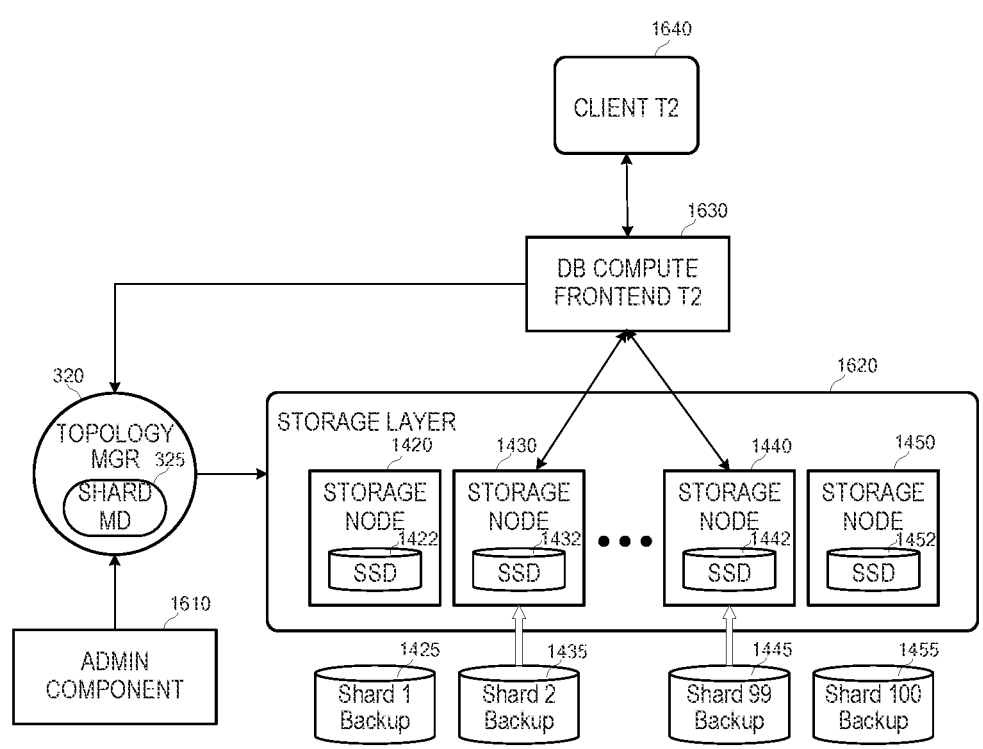
FIG. 16 illustrates accessing historical database data of a first database tenant using a second database tenant according to some embodiments.

FIG. 16 illustrates accessing historical data of a first database tenant using a second database tenant according to some embodiments of process 1500. An administrator may interact with a user interface of administrator component 1610 to submit the request received at S1510 to topology manager 320. After S1540, storage layer 1620 may be made accessible to database compute frontend 1630 of the second tenant. In this regard, database compute frontend 1630 may be instantiated using spare resources of a compute layer in response to the request received at S1510. Notably, database compute frontend 1630 accesses storage layer 1620 prior to the recovery of any database table shards of the second tenant into storage layer 1620. Accordingly, database compute frontend 1630 may access storage layer 1620 very quickly after receipt of the request at S1510.

At S1550, a request for access to one or more database table shards of the second database tenant is received. The one or more database table shards may include the deleted and/or modified historical data. The request may be received by topology manager 320 from database compute frontend 1630 in response to a request received from client 1640. For example, client 1640 may request all of the data of a given database table. Client 1640 may be logged in to the second tenant and operated by a user who is also a user of the first tenant, since the data to be accessed is data of the first tenant.

Topology manager 320 then determines, at S1560 and based on the newly-created root shard of the second tenant, the shards which are needed to fulfill the request (i.e., all shards associated with the given database table), and whether these shards are stored in storage layer 1620. If the shards are not available in storage layer 1620 (which they will not be on first access), identifiers of the backup data associated with the point in time for each shard are determined from the root shard. The shards are then recovered at S1570 from the backup locations specified by the identifiers to one or more storage nodes. The root shard of the second tenant is also updated to specify the storage node in which each recovered shard is now stored. FIG. 16 illustrates recovery of two shards via the arrows from backup location 1435 to storage node 1430 and from backup location 1445 to storage node 1440.

At S1580, topology manager 320 provides identifiers of the storage nodes in which the shards are stored to database compute frontend 1630. Continuing the present example, frontend 1630 may then access the shards from the identified storage nodes 1430 and 1440. Flow returns to S1550 to await another request for shard access.

It will be assumed that a request to access an already-recovered shard of the second tenant is received from frontend 1630 at S1550. It is therefore determined at S1560, based on metadata of the root shard of the second tenant, that the shard has already been recovered to a storage node. Flow therefore proceeds directly to S1580 to provide an identifier of the storage node storing the shard to the requestor as described above. Therefore, according to some embodiments, a shard of the first tenant database is recovered to the second tenant database from a backup location only in response to a first request for access to the shard by the second tenant. If the second tenant never requests access to a shard (e.g., because a user is not interested in the historical data of the shard), the shard is never copied to storage layer 1620, thereby saving storage resources.

Figure 17:
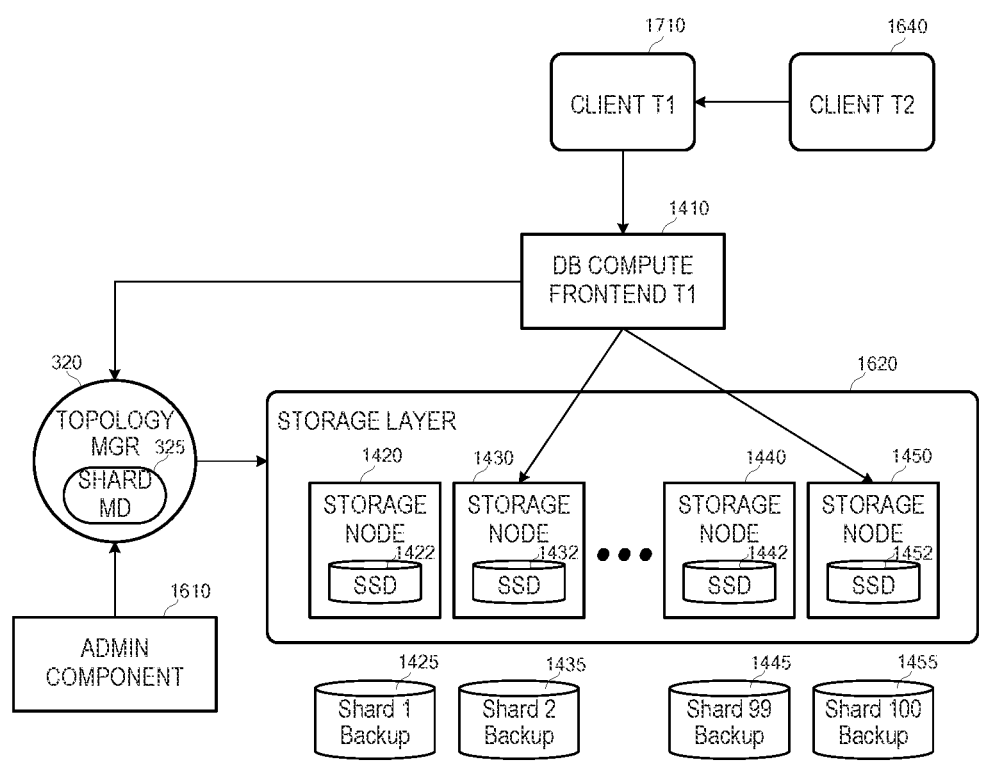
FIG. 17 illustrates overwriting database data of a first database tenant with historical data of the first database tenant according to some embodiments.

FIG. 17 illustrates a scenario similar to FIG. 16. It is assumed that client 1640 has accessed desired historical data of a first tenant as described above. FIG. 17 shows transmission of the historical data from client 1640 to client 1710, which is logged into compute frontend 140 of the first tenant (i.e., T1). The historical data may be transmitted via one or more of any intermediaries.

Client 1710 may request overwriting of current data of a database table of the first tenant with the historical data of the database table in order to revert the database table to the state in which it existed at the requested point in time. Accordingly, frontend 1410 determines the storage locations of the shards (e.g., nodes 1430 and 1450) including the historical data of the database table based on shard metadata 325 and the root shard of the first tenant and may overwrite the portions of the shards which correspond to the database table with the respective historical data. Frontend 1410 may write the historical data to any other storage nodes, whereafter the metadata of the first tenant root shard is updated to indicate the storage nodes to which the shards of historical were written.

The second tenant may be dropped once the historical data is viewed, acquired or otherwise used. Dropping the second tenant may include removing associated metadata from the system control shard, deallocating memory storing shards of the second tenant in the storage layer, and/or terminating the process of compute frontend 1630.

Shards which are recovered to a respective storage node according to process 1500 may be replicated to two or more other storage nodes to provide the benefits described above. This replication may occur in response to recovery of the shard, asynchronously, in batches of recovered shards, etc. Some embodiments omit this replication because the desired access to historical data is temporary and/or because each shard of historical data may be quickly recovered to the storage layer from its associated backup data.

Figure 18:
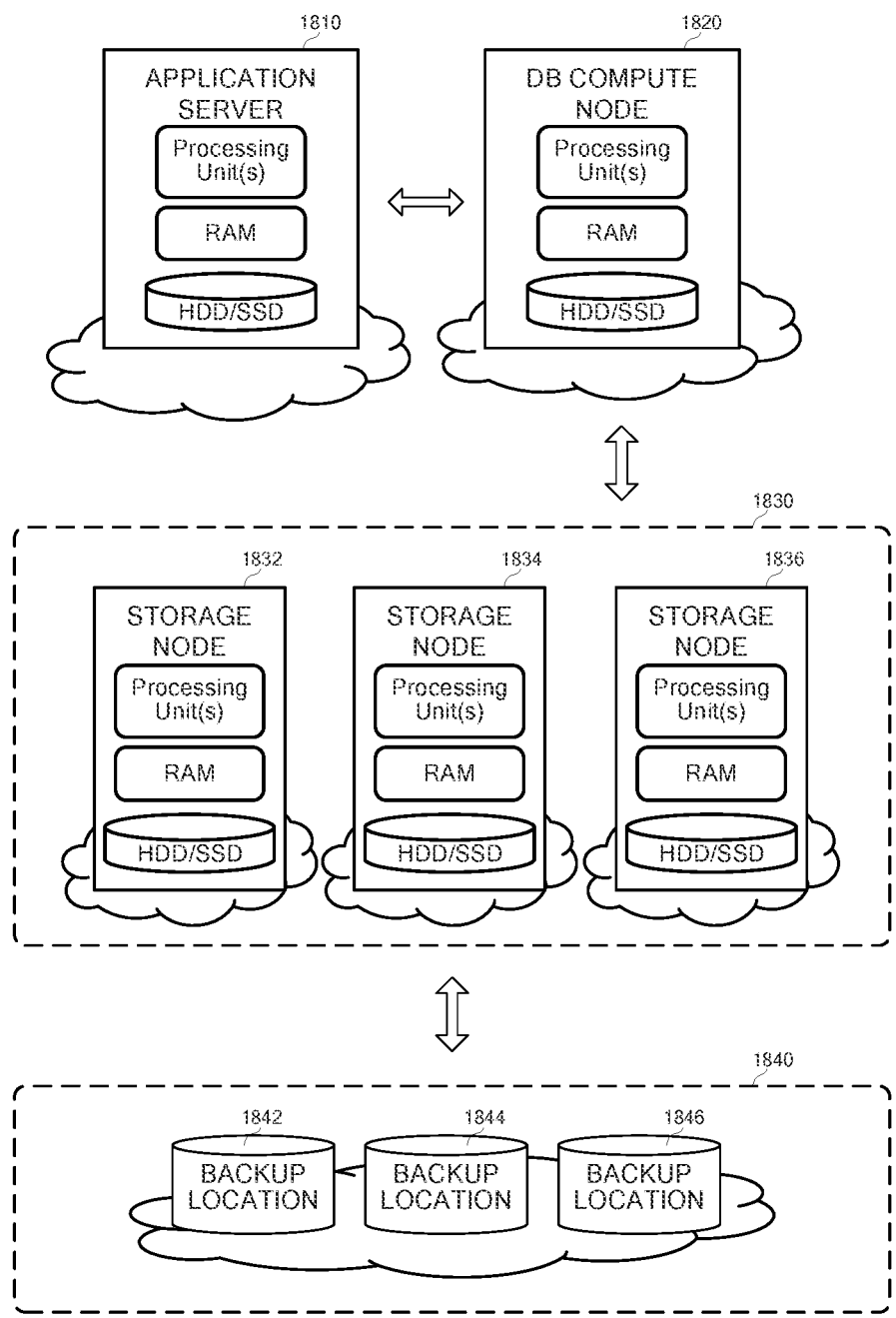
FIG. 18 is a block diagram of cloud-based virtual machines providing a database service according to some embodiments.

FIG. 18 is a block diagram of cloud-based environment according to some embodiments. Each component may be implemented using any suitable combination of hardware and software that is or becomes known. For example, each component may comprise a physical computer server or a virtual machine. Such virtual machines may reside in one or more public clouds providing self-service and immediate provisioning, autoscaling, security, compliance and identity management features.

Application server 1810 executes one or more applications which issue database queries. The applications may be accessed by users (not shown) who request information from the applications, thereby triggering issuance of the database queries. Application server 1810 transmits the queries to database compute node 1820, which executes a database instance (e.g., an indexserver). Based on the queries, the database instance instructs CRUD operations on data stored in storage nodes 1832, 1834 and 1836 of storage layer 1830.

The data is stored in storage nodes 1832, 1834 and 1836 of storage layer 1830 in any manner described above. For example, the data of a given table may be stored in shards distributed throughout storage nodes 1832, 1834 and 1836, and each shard may be replicated across multiple storage nodes. The data may include data of more than one tenant, where each shard of a given tenant is identified in metadata by a tenant identifier, a table identifier and a key range. Database compute node 1820 uses the metadata to determine the locations of shards on which operations are desired.

The shard data stored in storage nodes 1832, 1834 and 1836 of storage layer 1830 is backed up to backup locations 1842, 1844 and 1846 of backup layer 1840. Upon receipt of a request to access data of a tenant database associated with a particular point in time, metadata of a new tenant database is created based on the metadata of the tenant database. As described with respect to FIG. 15, a shard of the new tenant database is recovered to storage layer 1830 from backup data of backup layer 1840 which corresponds to the point in time in response to a request from the new tenant to access the shard.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more computer-readable media. Such media may include, for example, a hard disk, a DVD-ROM, a Flash drive, magnetic tape, and solid-state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a backup layer comprising:
   a first backup location storing a backup of a first shard of a first database table of a database of a first tenant, the first shard including a first key range of the first database table;
   a second backup location storing a backup of a second shard of the first database table, the second shard including a second key range of the first database table;
   a plurality of storage nodes of a storage layer, each of the plurality of storage nodes comprising a respective processing unit and a respective data storage device; and
   a manager node comprising a first processing unit and a first data storage device, the manager node to:
   receive a first request to recover data of the database to a point in time;
   in response to the first request:
      determine that the backup of the first shard corresponds to the point in time and the backup of the second shard corresponds to the point in time; and
      generate first metadata associating the second tenant with the first shard and the second shard, the first shard with the backup of the first shard, and the second shard with the backup of the second shard;
   receive a second request to access the first shard and the second shard from a requestor associated with the second tenant; and
   in response to the second request:
      determine based on the first metadata that the first shard and the second shard are not stored in any of the plurality of storage nodes; and
      in response to the determination that the first shard and the second shard are not stored in any of the plurality of storage nodes:
      instruct recovery of the first shard to a first storage node of the plurality of storage nodes from the first backup location;
      instruct recovery of the second shard to a second storage node of the plurality of storage nodes from the second backup location; and
      return an identifier of the first storage node and an identifier of the second storage node to the requestor.

2. A system according to claim 1, further comprising a third backup location storing a second backup of the first shard not corresponding to the point in time.

3. A system according to claim 2, further comprising a fourth backup location storing a second backup of the second shard not corresponding to the point in time.

4. A system according to claim 1, the system to:
   overwrite a portion of the first shard of the first database table of the database of the first tenant with a portion of the first shard recovered to the first storage node; and
   overwrite a portion of the second shard of the first database table of the database of the first tenant with a portion of the second shard recovered to the second storage node.

5. A system according to claim 1, the system to:
   write the first shard recovered to the first storage node to a third storage node of the plurality of storage nodes;
   write the second shard recovered to the second storage node to a fourth storage node of the plurality of storage nodes; and
   update metadata associated with the first tenant to associate the first shard with the third storage node and the second shard with the fourth storage node.

6. A system according to claim 1, further comprising:
   a third backup location storing a backup of a third shard of a second database table of the database of the first tenant, the third shard including a first key range of the second database table; and
   a fourth backup node location storing a backup of a fourth shard of the second database table, and the fourth shard including a second key range of the second database table,
   wherein the manager node is to:
   in response to the first request:
      determine that the backup of the third shard corresponds to the point in time and the backup of the fourth shard corresponds to the point in time,
      wherein generation of the first metadata comprises generation of first metadata associating the second tenant with the third shard and the fourth shard, the third shard with the backup of the third shard, and the fourth shard with the backup of the fourth shard;
   receive a third request to access the third shard and the fourth shard from a requestor associated with the second tenant; and
   in response to the third request:
      determine based on the first metadata that the third shard and the fourth shard are not stored in any of the plurality of storage nodes; and
      in response to the determination that the third shard and the fourth shard are not stored in any of the plurality of storage nodes:
      instruct recovery of the third shard to a third storage node of the plurality of storage nodes from the third backup location;
      instruct recovery of the fourth shard to a fourth storage node of the plurality of storage nodes from the fourth backup location; and
      return an identifier of the third storage node and an identifier of the fourth storage node to the requestor.

7. A computer-implemented method comprising:
receiving a first request to recover data of a database of a first tenant to a point in time;
in response to the first request:
determining that a backup of a first shard of a first database table of the database corresponds to the point in time and a backup of a second shard of the first database table corresponds to the point in time, the first shard including a first key range of the first database table and the second shard including a second key range of the first database table;
generating first metadata associating a second tenant with the first shard and the second shard, the first shard with the backup of the first shard, and the second shard with the backup of the second shard;
receiving a second request to access the first shard and the second shard from a requestor associated with the second tenant; and
in response to the second request:
determining based on the first metadata that the first shard and the second shard are not stored in any of a plurality of storage nodes of a storage layer; and
in response to the determination that the first shard and the second shard are not stored in any of the plurality of storage nodes:
recovering the first shard to a first storage node of the plurality of storage nodes from the backup of the first shard;
recovering the second shard to a second storage node of the plurality of storage nodes from the backup of the second shard; and
returning an identifier of the first storage node and an identifier of the second storage node to the requestor.

8. A method according to claim 7, wherein determining that a backup of a first shard of a first database table of the database corresponds to the point in time and a backup of a second shard of the first database table corresponds to the point in time comprises:
determining that the backup of the first shard corresponds to the point in time from a plurality of stored backups of the first shard, wherein each of the plurality of backups of the first shard corresponds to a different respective point in time.

9. A method according to claim 8, wherein determining that a backup of a first shard of a first database table of the database corresponds to the point in time and a backup of a second shard of the first database table corresponds to the point in time comprises:
determining that the backup of the second shard corresponds to the point in time from a plurality of stored backups of the second shard, wherein each of the plurality of backups of the second shard corresponds to a different respective point in time.

10. A method according to claim 7, further comprising:
overwriting a portion of the first shard of the first database table of the database of the first tenant with a portion of the first shard recovered to the first storage node; and
overwriting a portion of the second shard of the first database table of the database of the first tenant with a portion of the second shard recovered to the second storage node.

11. A method according to claim 7, further comprising:
writing the first shard recovered to the first storage node to a third storage node of the plurality of storage nodes;
writing the second shard recovered to the second storage node to a fourth storage node of the plurality of storage nodes; and
updating metadata associated with the first tenant to associate the first shard with the third storage node and the second shard with the fourth storage node.

12. A method according to claim 7, further comprising:
in response to the first request:
determining that a backup of a third shard of a second database table of the database of the first tenant corresponds to the point in time and a backup of a fourth shard of the second database table corresponds to the point in time,
wherein generating the first metadata comprises generating first metadata associating the second tenant with the third shard and the fourth shard, the third shard with the backup of the third shard, and the fourth shard with the backup of the fourth shard;
receiving a third request to access the third shard and the fourth shard from a requestor associated with the second tenant; and
in response to the third request:
determining based on the first metadata that the third shard and the fourth shard are not stored in any of a plurality of storage nodes of a storage layer; and
in response to the determination that the third shard and the fourth shard are not stored in any of the plurality of storage nodes:
recovering the third shard to a third storage node of the plurality of storage nodes from the backup of the third shard;
recovering the fourth shard to a fourth storage node of the plurality of storage nodes from the backup of the fourth shard; and
returning an identifier of the third storage node and an identifier of the fourth storage node to the requestor.

13. A non-transitory computer-readable medium storing program code, the program code executable by a computing system to:
receive a first request to recover data of a database of a first tenant to a point in time;
in response to the first request:
determine that a backup of a first shard of a first database table of the database corresponds to the point in time and a backup of a second shard of the first database table corresponds to the point in time, the first shard including a first key range of the first database table and the second shard including a second key range of the first database table;
generate first metadata associating a second tenant with the first shard and the second shard, the first shard with the backup of the first shard, and the second shard with the backup of the second shard;
receive a second request to access the first shard and the second shard from a requestor associated with the second tenant; and
in response to the second request:
determine based on the first metadata that the first shard and the second shard are not stored in any of a plurality of storage nodes of a storage layer; and
in response to the determination that the first shard and the second shard are not stored in any of the plurality of storage nodes:
recover the first shard to a first storage node of the plurality of storage nodes from the backup of the first shard;

recover the second shard to a second storage node of the plurality of storage nodes from the backup of the second shard; and return an identifier of the first storage node and an identifier of the second storage node to the requestor.

14. A medium according to claim 13, wherein determination that a backup of a first shard of a first database table of the database corresponds to the point in time and a backup of a second shard of the first database table corresponds to the point in time comprises:

determination that the backup of the first shard corresponds to the point in time from a plurality of stored backups of the first shard, wherein each of the plurality of backups of the first shard corresponds to a different respective point in time.

15. A medium according to claim 14, wherein determination that a backup of a first shard of a first database table of the database corresponds to the point in time and a backup of a second shard of the first database table corresponds to the point in time comprises:

determination that the backup of the second shard corresponds to the point in time from a plurality of stored backups of the second shard, wherein each of the plurality of backups of the second shard corresponds to a different respective point in time.

16. A medium according to claim 14, the program code executable by a computing system to:

overwrite a portion of the first shard of the first database table of the database of the first tenant with a portion of the first shard recovered to the first storage node; and overwrite a portion of the second shard of the first database table of the database of the first tenant with a portion of the second shard recovered to the second storage node.

17. A medium according to claim 14, the program code executable by a computing system to:

write the first shard recovered to the first storage node to a third storage node of the plurality of storage nodes;

write the second shard recovered to the second storage node to a fourth storage node of the plurality of storage nodes; and update metadata associated with the first tenant to associate the first shard with the third storage node and the second shard with the fourth storage node.

18. A medium according to claim 14, the program code executable by a computing system to:

in response to the first request:

determine that a backup of a third shard of a second database table of the database of the first tenant corresponds to the point in time and a backup of a fourth shard of the second database table corresponds to the point in time, wherein generation of the first metadata comprises generation of first metadata associating the second tenant with the third shard and the fourth shard, the third shard with the backup of the third shard, and the fourth shard with the backup of the fourth shard;

receive a third request to access the third shard and the fourth shard from a requestor associated with the second tenant; and in response to the third request:

determine based on the first metadata that the third shard and the fourth shard are not stored in any of a plurality of storage nodes of a storage layer; and in response to the determination that the third shard and the fourth shard are not stored in any of the plurality of storage nodes:

recover the third shard to a third storage node of the plurality of storage nodes from the backup of the third shard;

recover the fourth shard to a fourth storage node of the plurality of storage nodes from the backup of the fourth shard; and return an identifier of the third storage node and an identifier of the fourth storage node to the requestor.

* * * * *